(12) United States Patent
Steinmetz

(10) Patent No.: US 10,316,972 B2
(45) Date of Patent: Jun. 11, 2019

(54) MARKED KEG/CASK SEAL, AND METHOD FOR DETERMINING THE AGE OF A KEG/CASK SEAL

(71) Applicant: DSI GETRAENKEARMATUREN GMBH, Hamm (DE)

(72) Inventor: Harald Steinmetz, Aachen (DE)

(73) Assignee: DSI GETRAENKEARMATUREN GMBH, Hamm (DE)

( * ) Notice: Subject to any disclaimer, the term of this patent is extended or adjusted under 35 U.S.C. 154(b) by 0 days.

(21) Appl. No.: 15/744,759

(22) PCT Filed: Jul. 13, 2016

(86) PCT No.: PCT/DE2016/100313
§ 371 (c)(1),
(2) Date: Jan. 12, 2018

(87) PCT Pub. No.: WO2017/008787
PCT Pub. Date: Jan. 19, 2017

(65) Prior Publication Data
US 2018/0202555 A1   Jul. 19, 2018

(30) Foreign Application Priority Data

Jul. 14, 2015 (DE) .................. 10 2015 111 376

(51) Int. Cl.
| | | |
|---|---|---|
| *F16J 15/12* | (2006.01) | |
| *F16J 13/02* | (2006.01) | |
| *F16J 15/06* | (2006.01) | |

(52) U.S. Cl.
CPC ............. *F16J 15/121* (2013.01); *F16J 13/02* (2013.01); *F16J 15/064* (2013.01)

(58) Field of Classification Search
CPC ..... F16J 15/121; F16J 13/02; F16J 15/064; F16J 15/108; F16J 15/32; F16J 15/022
USPC .......................................................... 277/641
See application file for complete search history.

(56) References Cited

U.S. PATENT DOCUMENTS

| | | | | |
|---|---|---|---|---|
| 2,961,111 | A | | 11/1960 | Nesme |
| 3,029,773 | A | * | 4/1962 | Collins ............... B41F 17/16 101/41 |
| 7,128,228 | B2 | * | 10/2006 | Collins ............... B01L 3/50825 215/247 |
| 2002/0084263 | A1 | * | 7/2002 | Wennennann ......... H05B 3/74 219/460.1 |

(Continued)

FOREIGN PATENT DOCUMENTS

| | | |
|---|---|---|
| DE | 10023117 C1 | 6/2001 |
| DE | 10120890 A1 | 1/2002 |

(Continued)

OTHER PUBLICATIONS

International Search Report, Application No. PCT/DE2016/100313, dated Nov. 21, 2016, 13 pp.

(Continued)

*Primary Examiner* — Nathan Cumar
(74) *Attorney, Agent, or Firm* — Hauptman Ham, LLP

(57) ABSTRACT

A keg/cask seal for a keg or cask containing a beverage is disclosed. A color mark is arranged in a geometrically defined shape on a top side of the keg/cask seal. The geometrically defined color mark allows a conclusion to be drawn about the time lapsed since the keg/cask seal was installed.

10 Claims, 5 Drawing Sheets

(56) References Cited

U.S. PATENT DOCUMENTS

| | | | |
|---|---|---|---|
| 2009/0102142 A1* | 4/2009 | Tanaka | F16J 15/061 |
| | | | 277/650 |
| 2009/0133593 A1* | 5/2009 | Till | B41J 3/4073 |
| | | | 101/35 |
| 2010/0288721 A1 | 11/2010 | Atkin | |
| 2010/0330349 A1 | 12/2010 | Ewald et al. | |
| 2011/0059297 A1 | 3/2011 | Kritzer et al. | |
| 2014/0001708 A1* | 1/2014 | Ewing | F16J 15/108 |
| | | | 277/590 |
| 2016/0009456 A1 | 1/2016 | Van De Klippe et al. | |

FOREIGN PATENT DOCUMENTS

| | | |
|---|---|---|
| DE | 102009016429 A1 | 10/2010 |
| EP | 2096580 A1 | 9/2009 |
| EP | 2128802 A1 | 12/2009 |
| WO | 2010132767 A1 | 11/2010 |
| WO | 2014128091 A1 | 8/2014 |

OTHER PUBLICATIONS

German Search Report, Application No. 10 2015 111 376.7, dated Nov. 17, 2015, 7 pp.
International Preliminary Report on Patentability for PCT/DE2016/100313 dated Jun. 19, 2017; 16pp.

* cited by examiner

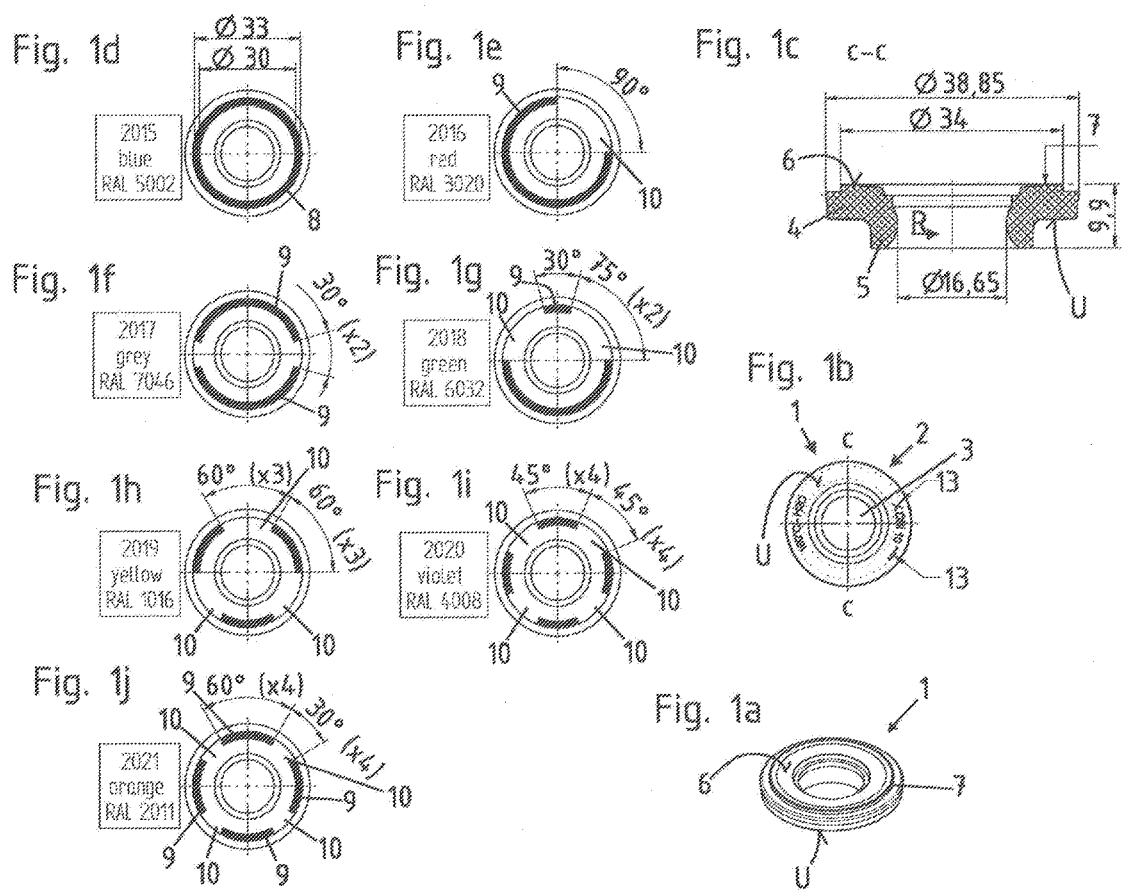

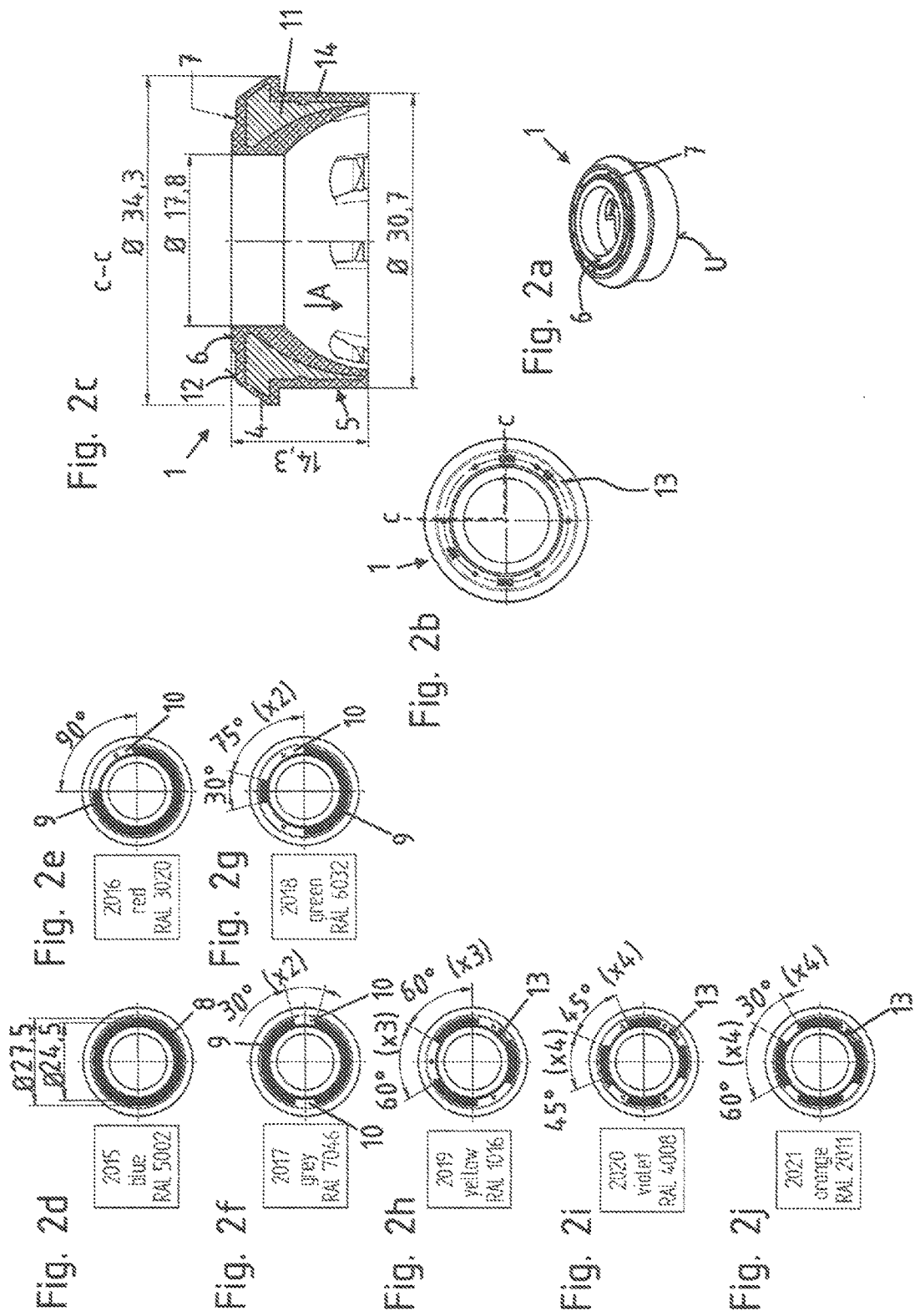

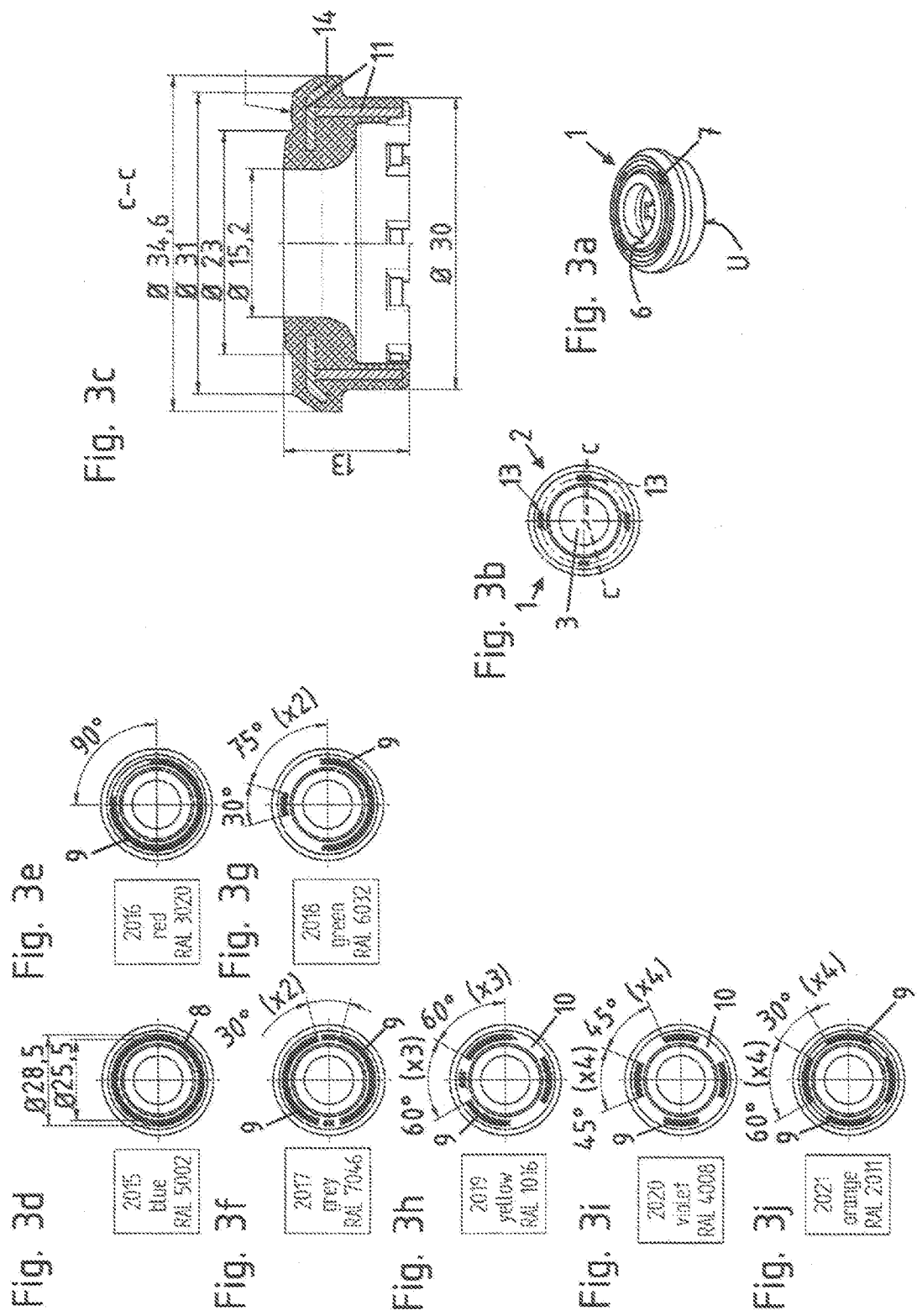

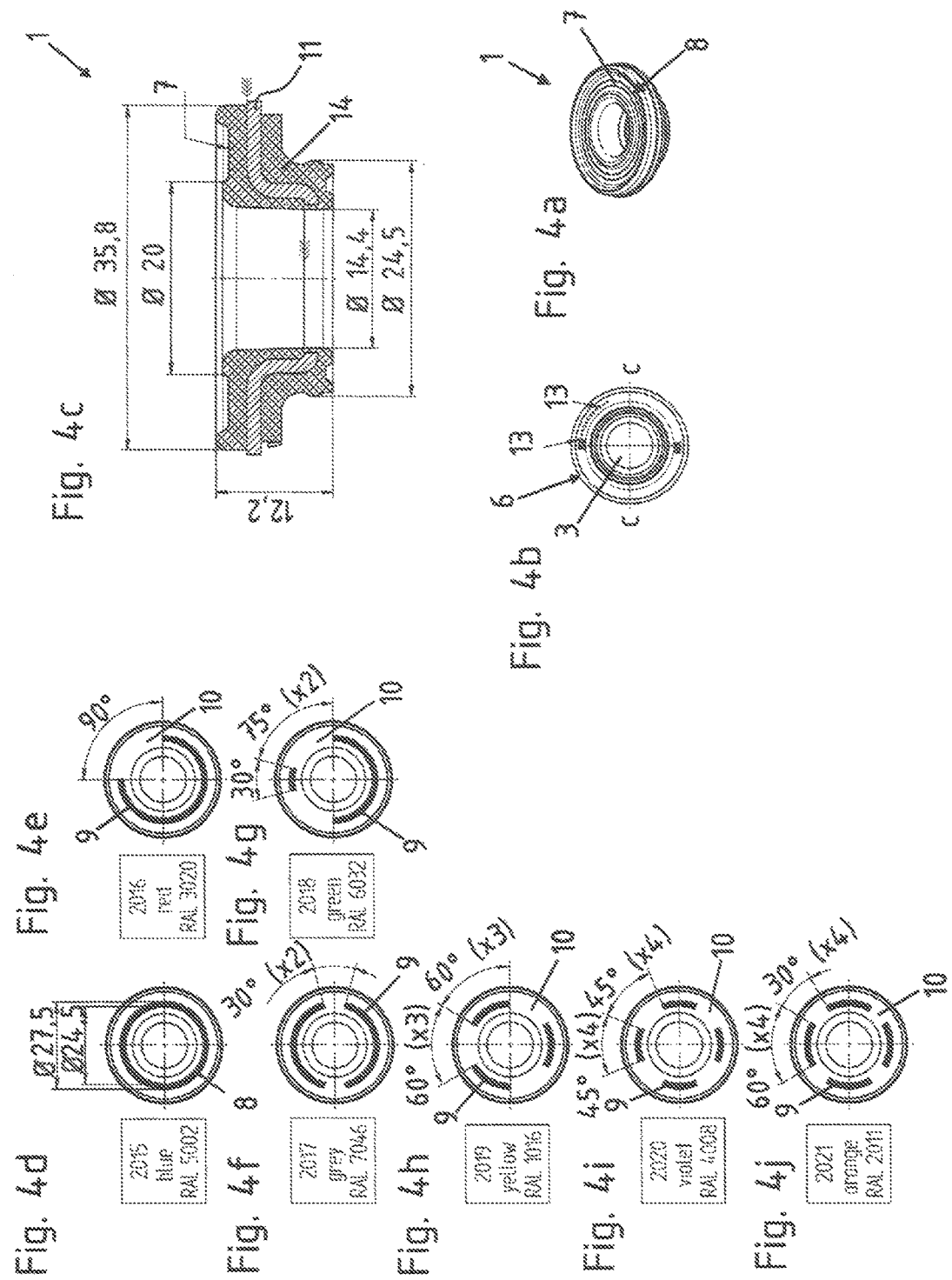

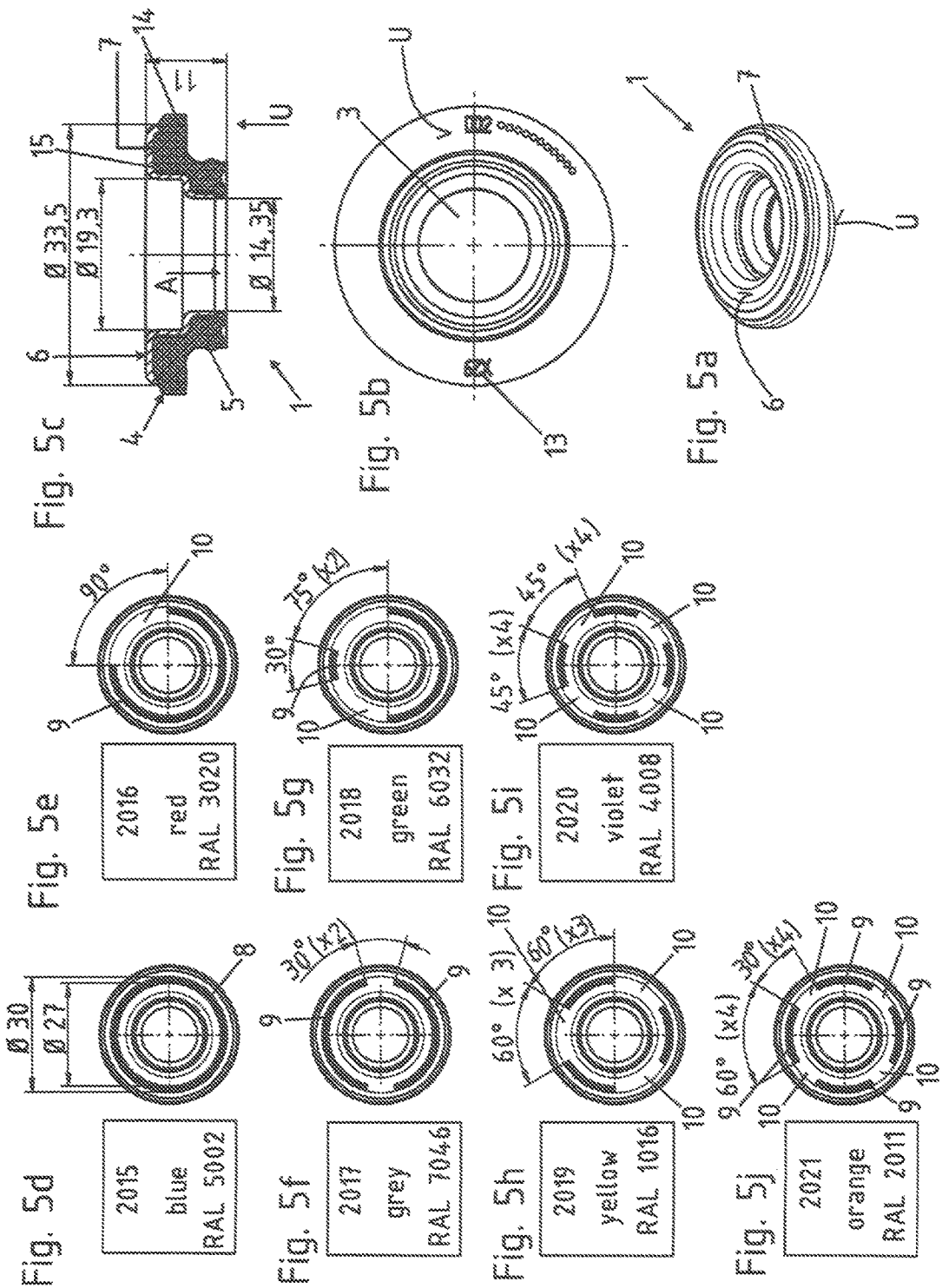

MARKED KEG/CASK SEAL, AND METHOD FOR DETERMINING THE AGE OF A KEG/CASK SEAL

RELATED APPLICATIONS

The present application is a National Phase of International Application Number PCT/DE2016/100313 filed Jul. 13, 2016 and is related to and claims priority benefits from German Application No. 10 2015 111 376.7 filed on Jul. 14, 2015.

BACKGROUND

1. Field of the Invention

The disclosure is related to a seal and, more specifically, to a keg/cask seal for a beverage-containing keg/cask, as well as an identification system for keg/cask seals and a method of determining the age of a keg/cask seal.

2. Description of the Related Art

It is known from the prior art to provide beverages in containers for the transport, for the storage, but also for the supply of the beverages. For this purpose, use is firstly made of bottles, but beverage-containing kegs/casks are used in the case of greater quantities. These can then accommodate a volume of 10 liters and more, in particular between 10 and 150 liters.

The beverage containing kegs/casks are standardized for various types of beverage and container sizes. The standardization relates to the material from which the keg/cask is produced, the external dimensions and in particular the keg/cask connector. The beverage is firstly filled into the keg/cask via the keg/cask connector in the brewery or in the filling plant. The keg/cask seal then keeps the beverage, in particular at a positive pressure, for transport and for storage in the keg/cask. At the use location, for example in a restaurant, the keg/cask is connected to an extraction point, in particular to a dispensing system. For this purpose, there are various types of closures which are plugged and/or clamped onto the keg/cask. The keg/cask seal also at the same time seals the coupled closure here, and therefore the dispensed or extracted beverage is supplied via a line to a dispensing point or a dispensing tap.

During these operations (filling, storage, dispensing), the keg/cask seals are exposed to use-induced wear, in particular abrasive wear. At the same time, however, the keg/cask seals are subject to an aging process, and therefore, depending on the sealing material used, the latter may sometimes become porous or brittle.

SUMMARY

According to one exemplary embodiment, a keg/cask seal is provided which can be simply and effectively identified in respect of its age and/or the period of use in both a manual and a fully automated manner. Furthermore, a method for carrying out this identification is also disclosed.

Advantageous variant embodiments are described in the dependent patent claims.

The keg/cask seal for a beverage-containing keg/cask has a round basic body composed of a sealing material. The sealing material is in particular a plastics material or a rubbery material. A recess, in particular a round recess, reaches through the material in the central region. The basic body is formed from an upper plate-like region and a web region extending downward therefrom in the installed position. According to the invention, the keg/cask seal is distinguished in that a colored marking with a defined geometrical shape is applied to an upper side of the plate-like region.

It is therefore redundantly possible to classify or identify the keg/cask seal in respect of age, in particular installation age, on the basis of the geometrical shape of the colored marking, but also on the basis of the color used. This provides the possibility in particular that, if the paint of the geometrical shape is damaged or else the colored marking has faded, sufficient, in particular redundant, detection of the period of time, in particular assignment to the assembly year, is possible via at least one of the features (color, geometrical shape). This classification is assigned in particular to a period of time. For example, the color and/or the geometrical shape can be changed in a time interval of a particular calendar year.

In the simplest refinement, a circular ring is in particular applied to the upper side of the basic body. The upper side is basically visible on the stored keg/cask. Either an installer or stockist can detect the color and/or geometrical shape by means of the human eye. It is also possible, in a partially mechanized manner, for example using a hand scanning device, to detect color and/or shape. Furthermore, it is likewise possible to detect color and/or shape of the keg/cask in a fully automated manner, for example in a filling plant, by an optical sensor, in particular a camera-based sensor.

According to yet another exemplary embodiment, the geometrical shape is an encircling circular ring with a color. This color is, for example, blue; it can then be assigned to a calendar year X. If the calendar year then changes into the year X+1, a different color can be used, for example red. In the calendar year X+2 following the latter in turn, a new color can then be used, for example grey.

The choice of colors can involve in particular colors from the RAL color code system. The colors blue RAL 5002, red RAL 3020, grey RAL 7046, green RAL 6032, yellow RAL 1016, violet RAL 4008, orange RAL 2011, magenta RAL 4010, white RAL 1013 and light green RAL 6027 are particularly preferred. In the case of these colors, particularly advantageous color reproduction and/or color identification has been proven because of variously used external colorings and/or coatings of kegs/casks and depending on the sealing material used for the basic body. Other color coding systems, for example pantones, can also be used.

A QR code, a bar code or an internal-system code can also be used for the geometrical shape.

However, the geometrical shape is particularly preferably designed in such a manner that it is an at least partially encircling ring. This ring is preferably divided into individual ring segments. For example, a ring segment can be designed as a three-quarter circle. Consequently, a ring segment of 90° is cut out of the encircling circular ring or is not marked in color. Furthermore, if the color has faded, it is therefore redundantly possible to identify the period of time assigned to the marking not only on the basis of the color itself, but also on the basis of the geometrical shape. The completely encircling ring is therefore assigned in turn to the year X and, for example, the geometrical shape of a ring segment, cut out to 90°, of the encircling ring is then assigned to the calendar year X+1.

It has proven particularly advantageous within the context of the invention if one, two, three or four ring segments form the partially encircling ring as the geometrical shape.

According to an exemplary embodiment, the partially encircling ring are listed below. It has proven advantageous furthermore to use two ring segments, wherein a 30° ring segment is cut out from the encircling ring on two opposite sides in each case. As an alternative thereto, use can also be made of two ring segments which are not identical to each other and in which a ring segment of 75° is in each case cut out on two sides which, however, do not lie in a complementary manner opposite each other. Consequently, a smaller ring segment with a colored marking and a ring segment which is larger by comparison and likewise has a colored marking are produced.

According to yet another exemplary embodiment, three ring segments are provided. For this purpose, ring segments of 60° are preferably cut out in each case distributed in a radially encircling manner at three opposite points.

It has likewise proven advantageous to use four ring segments. For this purpose, four ring segments are preferably cut out in turn at 45° or else four ring segments at 30° at four opposite points distributed in a radially encircling manner. The respectively remaining ring segments are correspondingly marked in color. For example, 70 combinations can be realized when 10 RAL color tones and 7 patterns are used.

In order to realize the colored marking, the marking is applied in particular by means of a color application method. For this purpose, first of all the keg/cask seal is therefore produced with its basic body. Depending on the type of keg/cask seal, additional reinforcements, for example fibers or else a metal reinforcement can be introduced. In particular, the keg/cask seals are produced from a sealing material based on plastic. Rubbery sealing materials are particularly preferably used. The latter are in particular cast, injection molded or produced in some other processing manner. The colored marking is then applied in the predetermined geometrical shape. This can be produced in particular by pad printing, screen printing/spray paint or else by means of a film transfer method. The colored marking, preferably the paint, is preferably applied in multi-layered form. This takes place in particular in at least two-layered form, preferably three-layered form or multi-layered form. By means of the multi-layered application, the covering capacity of the colored marking is increased, in particular in relation to a black underlying surface. Furthermore, better resistance in relation to mechanical abrasion and chemical influences, such as acids and alkalies, is produced.

The color for the colored marking is in particular a two-component paint. This color, but also other colors which are used, is/are colors curing in particular in a food-conforming and/or abrasion-proof and/or acid-resistant and/or temperature-resistant and/or permanently elastic manner.

The food conformity provides the advantage that it can be used in the beverage industry irrespective of the beverage which is used.

The abrasion strength provides good resistance against abrasive and mechanical processes which may occur during the filling operation and/or attaching of a dispensing head and also in the event of incorrect handling during transportation.

The acid resistance provides the advantage that the kegs/casks can be correspondingly chemically cleaned after use. Furthermore, depending on the beverage poured in and/or gas used for dispensing the beverage, the acid resistance provides the advantage of providing an appropriate resistance.

The temperature resistance provides the advantage that, in the event of different storage temperatures and/or dispensing temperatures and also temperatures during cleaning and disinfecting in turn, the paint is not at risk either in terms of its color reproduction or in terms of its adhesive properties and therefore, for example, dissolving or flaking off is prevented. The keg/cask seal and also the paint are preferably resistant to cleaning means, in particular ethanol.

Furthermore, within the context of the invention, use is made of a color which is a color curing in a permanently elastic manner. By means of the filling operations, storage operations and/or also the attaching of a dispensing head, the keg/cask seal is elastically deformed. Owing to the applied colored marking with a color curing in a permanently elastic manner, it is possible for the colored marking to be adapted to the respective surface and surface shape by elastic deformation and not to flake off and/or become brittle.

Alternatively, it is also possible for the colored marking to be produced integrally in the keg/cask seal, in particular in the upper side. For this purpose, for example in the case of a rubber injection operation, first of all an additive can be introduced into the mold, wherein the additive in the subsequent colored marking is produced in the predetermined geometrical shape. Subsequently, the sealing material is introduced into the mold. The additive here can be, for example, an additional material which is connected integrally to the sealing material, in particular to the rubber. However, the additive can also be a chemical substance of the type which colors or recolors the sealing material. Within the context of the invention, it would also be conceivable to color the entire keg/cask seal and then correspondingly to undertake geometrical shaping.

Furthermore, the geometrical shape as shaped surface is set back in relation to a sealing surface of the upper side, wherein in particular the color is at least partially arranged in the shaped surface. It is conceivable in turn here that the upper side of the plate-like region does not have a flat profile, but rather, for example, runs radially inward or outward at an angle to a flat reference plane. The colored marking is then applied in the region which does not come into contact directly flat with the reference plane, but rather is set back in relation thereto.

However, it is also possible within the scope of the invention that the shaped surface for forming the geometrical shape is introduced into the surface. This can be carried out, for example, with an embossing operation which causes plastic deformation. Furthermore, an abrasive or else chip-removing method is possible. It is likewise conceivable, by use of a laser, to introduce the corresponding geometrical shape plastically and/or three-dimensionally into the surface, in particular as a recessed contour. The shaped surface itself can be of larger design in its area than the area of the color application. For example, the shaped surface can be designed as an encircling ring set back at a distance from the surface. If the marking of the period of time now makes provision for only ring segments to be marked in color, only these ring segments marked in color are applied to the shaped surface. Within the scope of the invention, it is furthermore conceivable that, for example with an embossing or stamping method for producing the shaped surface by plastic deformation, the application of color is carried out at the same time. The application of color can also take place in a shaped surface which is already present, for example in a following groove.

According to an exemplary embodiment, an identification system for keg/cask seals of beverage-containing kegs/casks is disclosed. Previously described keg/cask seals are used for this identification system. The identification system is distinguished in that the colored marking is applied as an at least partially encircling ring to the upper side of the keg/cask seal, and a color and at least one segment portion of the ring are assigned to a defined period of time.

The period of time is in particular calendar years. It can however also be, for example, a filling year, a season or a period of time defined by the user of the identification system. A defined color and a geometrical shape or corresponding ring segments in the coloring can therefore be assigned to each period of time. Preferably, only one color is ever used on a keg/cask seal, and therefore satisfactory identification of the period of time is possible by manual, partially mechanized, but also fully automated visual recognition. However, within the scope of the invention, it would also be conceivable to use two colors combined.

When the aforementioned identification system having the keg/cask seals described is used, it is therefore possible to carry out a method for determining the installation age or age of a keg/cask seal. The kegs/casks are provided with the keg/cask seals within a certain period of time. For example, kegs/casks already used in year X are retrofitted or else kegs/casks are newly produced in year X. The kegs/casks are allocated a first color and a first geometrical shape for the year X.

In year X+1, the kegs/casks can then be subject to a visual check at the filling plant. By means of the colored and geometrical marking, the age of the keg/cask seal with respect to the predetermined period of time can therefore be determined. All of the keg/cask seals of year X can therefore be identified.

The age of the keg/cask seal is in particular the time of assembly of the keg/cask seal, consequently the installation age. The keg/cask seal itself can have a production date which is before this time, optionally also a longer period of time of weeks, months or even years before the time of the initial assembly.

The determination of the age then relates to the defined period of time. For example, in a calendar year X, it is possible to assign the assembly of the keg/cask seal to this year X. The keg/cask seal can then have already been assembled in January of year X, but also in the middle, for example in June of year X, or at the end of year X, consequently in December. In January of year X+1, another color with another geometrical marking is then predetermined and fitted from January 1 of year X+1. Consequently, in particular in the filling plant, year X can be identified by a manual, partially mechanized or else fully automated visual check and, depending on the respective specification of the beverage supplier and/or of the filling plant, can be replaced by the seal of year X+1 or X+n.

The system according to the invention affords in particular the advantage that the age of the keg/cask seal can be determined in a simple and rapid manner irrespective of where the keg/cask is located (filling plant, pub, store). Technical aids are not absolutely necessary. By means of the colored and geometrical shape, the keg/cask can be identified in a simple and non-error-prone manner for the human eye, and the age of the keg/cask seal can be determined, for example, with a reference table.

In filling plants, this method for checking can then be implemented in a fully automated manner by means of a camera-based sensor. At any time, however, the age of the keg/cask seal can again be checked by manual intervention and/or manual rechecking and the keg/cask seal can optionally be replaced.

BRIEF DESCRIPTION OF THE DRAWINGS

For an understanding of embodiments of the disclosure, reference is now made to the following description taken in conjunction with the accompanying drawings, in which:

FIGS. 1a to 1j are cross-sectional views of keg/cask seals in accordance with one exemplary embodiment;

FIGS. 2a to 2j are cross-sectional views of keg/cask seals in accordance with one exemplary embodiment;

FIGS. 3a to 3j are cross-sectional views of M type or L type keg/cask seal;

FIGS. 4a to 4j are cross-sectional views of keg/cask seal having a round basic body; and, FIGS. 5a to 5j are cross-sectional views of S type keg/cask seal.

In the figures, the same reference signs are used for identical or similar components, even if a repeated description is omitted for reasons of simplicity.

DETAILED DESCRIPTION OF SOME EMBODIMENTS

Some embodiments will be now described with reference to the Figures.

Referring now to FIGS. 1a and 1b, a perspective view and a top view of a first keg/cask seal. The latter is also known as an A type or G type. In the cross-sectional view according to FIG. 1c, dimensions are furthermore shown as details in millimeters, these dimensions being by way of example and not describing the keg/cask seal according to FIG. 1 in a limiting manner.

The keg/cask seal 1 according to FIG. 1 therefore has a round basic body 2 with a central recess 3. It can readily be seen according to the cross-sectional view of FIG. 1c that an upper plate-like region 4 is formed and a web region 5 extends in a manner located below the region. The upper side 6 is designed in such a manner that the latter has a dropping or oblique profile with respect to the radial direction R inward.

It is now provided that a marking 7 is present by means of an application of color.

The geometrical shape of the marking 7 is described in FIGS. 1d to 1j and can vary depending on the assigned period of time. However, the geometrical marking 7 is always designed as an at least partially encircling ring.

Referring to FIG. 1d, the geometrical shape is designed as a completely encircling ring 8. Geometrical dimensions corresponding to FIG. 1c are in turn also shown here, but they do not have to definitively define the shape of the ring 8. A first year, here 2015, with the color blue RAL 5002 is likewise stated by way of example.

Furthermore, FIGS. 1e to 1j then each illustrate ring segments 9 in a color, wherein the colors differ from one another. A respective calendar year from 2015 to 2021 is assigned to the colors, and the colors are mentioned by way of example with a RAL code. Furthermore, sections 10 likewise in the form of ring segments 9 of the encircling ring 8 are not marked in color, and therefore, in addition to the differing color, differing geometrical shapes or geometrical phenomena are produced. If the color were then to fade and/or the geometrical shape were then to be damaged, for example due to abrasive wear, a redundancy for visual checking and determining of the associated age of the keg/cask seal would in each case be possible. Furthermore, the angular ranges in FIGS. 1e to 1j of the ring segments 9 with color and the sections 10 without color are indicated by way of example. In FIG. 1b, irrespective of the marking according to the invention, further details 13, for example with regard to the manufacturer, the temperature resistance or the material or else the actual production year, can be attached on the underside U.

FIG. 2a shows a different keg/cask seal 1 in a perspective view and a view from the top is shown in FIG. 2b. The keg/cask seal 1 is also referred to as D type, wherein FIG. 2c, which illustrates a cross-sectional view according to the angled intersecting line c-c from FIG. 2b, shows that the keg/cask seal is formed from two components. For this purpose, a core material 11 is insert molded with a sealing material 14, for example a rubbery material. The keg/cask seal 1 has in turn a plate-like upper portion 4 with an upper side 6 and a web-shaped region 5 extending therefrom. A shaped surface 12 is now set back downward with respect to the plane of the image in relation to the upper side 6 in the axial direction A onto the installed position. The marking 7 is then in turn applied to the shaped surface 12 by the application of color. On account of the design, the shaped surface 12 is formed in the keg/cask seal 1 illustrated in FIG. 2, but can additionally also be introduced into the upper side 6 in order to implement the marking 7, for example by plastic deformation or abrasive methods, for example lasering. FIGS. 2d to 2j show analogously in turn the various variant embodiments of the geometrical shape assigned to the respective year from 2015 to 2021. Also indicated in turn are the associated colors according to the RAL color classification.

Also illustrated in FIG. 2b are details 13 which can be arranged on the surface 6 or on the shaped surface 12. Further details 13 can be formed, for example, by embossing corresponding surfaces, but can also be lasered in or can be protruding or recessed three-dimensionally in relation to the surface. For example, in FIGS. 2h and 2i it can readily be seen that the marking 7 can overlap with the details 13. This is possible in particular in a subsequent color application method.

The same also applies to the variants illustrated in FIG. 3. However, the reinforcement here is designed by way of example as a two-part core material 11. The core material 11 can also be formed integrally.

The keg/cask seal 1 illustrated in FIG. 3 is also referred to as an M type or L type.

Furthermore, FIGS. 4a to 4j illustrate a keg/cask seal 1 which likewise has a round basic body 2 with a centrally located recess 3. This seal is also referred to as a U type. Also here, analogously to the aforementioned figures, a color application in a geometrically defined shape is illustrated. Also here in turn a core material 11 is surrounded by a sealing material 14.

FIGS. 5a to 5j likewise show a keg/cask seal 1 which is also referred to as an S type. The latter also has an upper plate-like region 4 and a web-shaped region 5 extending downward therefrom, wherein a covering disk 15 is provided and the colored marking 7 is applied to the covering disk 15. Here too in turn a marking 7 is undertaken in the form of an application of color, and therefore, corresponding to FIGS. 5d to 5j, the corresponding marking 7 can in turn be assigned in conjunction with the color to a year. This is by way of example a two-part stated solution which can also be realized in one part according to the other examples by the core material 11 entering into a fixed connection with the sealing material 14.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A keg/cask seal for a beverage-containing keg/cask, comprising:
   a round basic body composed of rubbery sealing material,
   a recess reaching through the basic body,
   an upper plate region and a web region extending downwardly therefrom in an installed position,
   wherein a colored marking with a defined geometrical shape is applied to an upper side of the plate region by a color application method, and
   wherein the geometrical shape is an at least partially encircling ring,
   a smallest diameter of the recess at a plane is greater than a thickness of material of the keg/cask seal at the plane.

2. The keg/cask seal as claimed in claim 1, wherein one, two, three or four ring, segments spaced apart from one another in an encircling manner are applied as the geometrical shape.

3. The keg/cask seal as claimed in claim 1, wherein the colored marking is applied by pad printing, or as a spray paint or by means of film transfer methods.

4. The keg/cask seal as claimed in claim 1, wherein a two-component paint is used as the color for the colored marking.

5. The keg/cask seal as claimed in claim 1, wherein the color is a color curing in a food-conforming and/or abrasion-proof and/or acid-resistant and/or temperature-resistant and/or ethanol-resistant and/or permanently elastic manner.

6. The keg/cask seal as claimed in claim 1, wherein the colored marking is produced integrally in the upper side.

7. The keg/cask seal as claimed in claim 1, wherein the geometrical shape as shaped surface is set back in relation to a sealing surface of the upper side, and wherein the color is at least partially arranged in the shaped surface.

8. An identification system for keg/cask seals of beverage-containing kegs/casks using at least one keg/cask seal as claimed in claim 1, wherein the colored marking is applied to the upper side at least as a partially encircling ring, and wherein one color and at least one segment portion of the ring are assigned to a defined period of time.

9. A method for determining the age of a keg/cask seal, wherein kegs/casks having a keg/cask seal with the features of claim 1 are subject to a visual check, comprising determining the age of the keg/cask seal by the colored and geometrical marking.

10. The method as claimed in claim 9, further comprising providing an optical sensor to carry out the visual checks, and/or in that the color and the geometrical marking are implemented redundantly.

* * * * *